US009046347B2

(12) United States Patent
Barbier et al.

(10) Patent No.: US 9,046,347 B2
(45) Date of Patent: Jun. 2, 2015

(54) OPTICAL SYSTEM FOR MEASURING THE ORIENTATION OF A HELMET USING CORNER CUBES AND A TELECENTRIC EMISSION LENS

(75) Inventors: Bruno Barbier, Bordeaux (FR); Laurent Potin, Coutras (FR); Siegfried Rouzes, Le Haillan (FR)

(73) Assignee: Thales, Neuilly sur Seine (FR)

( * ) Notice: Subject to any disclaimer, the term of this patent is extended or adjusted under 35 U.S.C. 154(b) by 368 days.

(21) Appl. No.: 13/566,958

(22) Filed: Aug. 3, 2012

(65) Prior Publication Data

US 2013/0033711 A1    Feb. 7, 2013

(30) Foreign Application Priority Data

Aug. 5, 2011 (FR) .................................. 11 02463

(51) Int. Cl.
  *G01B 11/14*  (2006.01)
  *G01B 11/03*  (2006.01)
  *G01B 11/26*  (2006.01)
  *G01B 11/00*  (2006.01)

(52) U.S. Cl.
  CPC .............. *G01B 11/03* (2013.01); *G01B 11/002* (2013.01); *G01B 11/26* (2013.01)

(58) Field of Classification Search
  CPC ...... G01B 11/002; G01B 11/03; G01B 11/26; G01B 11/14; G01S 17/66
  See application file for complete search history.

(56) References Cited

U.S. PATENT DOCUMENTS

| | | | | |
|---|---|---|---|---|
| 3,628,869 A | * | 12/1971 | Clay et al. ..................... | 356/153 |
| 4,518,855 A | * | 5/1985 | Malak ......................... | 356/141.3 |
| 4,560,272 A | * | 12/1985 | Harris .......................... | 356/138 |
| 4,576,481 A | * | 3/1986 | Hansen ......................... | 356/620 |
| 5,059,789 A | * | 10/1991 | Salcudean .................. | 250/206.1 |
| 5,207,003 A | | 5/1993 | Yamada et al. | |
| 5,825,483 A | * | 10/1998 | Michael et al. ............ | 356/243.1 |
| 6,167,607 B1 | * | 1/2001 | Pryor ........................ | 29/407.04 |
| 6,486,955 B1 | | 11/2002 | Nishi | |
| 7,821,636 B2 | * | 10/2010 | Jeys et al. .................... | 356/342 |
| 2008/0218728 A1 | | 9/2008 | Kirschner | |
| 2009/0046152 A1 | * | 2/2009 | Aman .......................... | 348/157 |

FOREIGN PATENT DOCUMENTS

JP        2007 521462        8/2007

OTHER PUBLICATIONS

French Search Report for Counterpart French Patent Application No. 1102463, 7 pgs. (Feb. 16, 2012).

* cited by examiner

*Primary Examiner* — Kara E Geisel
*Assistant Examiner* — Rufus Phillips
(74) *Attorney, Agent, or Firm* — Blakely, Sokoloff, Taylor & Zafman LLP

(57) ABSTRACT

The overall field of the invention is that of systems for detecting the posture of a moving object in space. The device according to the invention comprises: a fixed electrooptical device comprising a point emission source, a telecentric lens comprising a projection lens, a reception lens and a semireflective optical element and a photosensitive matrix-type sensor, the point emission source being arranged at the common focal point of the projection lens and of the reception lens by reflection or transmission through the semireflective optical element, and; an assembly comprising at least three corner cube retroreflectors which are arranged on the moving object. The main application of this device is the detection of the orientation of an aircraft pilot helmet.

12 Claims, 2 Drawing Sheets

OPTICAL SYSTEM FOR MEASURING THE ORIENTATION OF A HELMET USING CORNER CUBES AND A TELECENTRIC EMISSION LENS

BACKGROUND OF THE INVENTION

1. Field of the Invention

The field of the invention is that of optical devices that can be used for contactlessly measuring the orientation of an object in space. There are various possible fields of application but the main application is detecting the posture of an aircraft pilot helmet so that an image can thus be projected onto his visor so that it is exactly superposed on the external landscape or so that various systems of the aircraft can be subjugated to his gaze. The precision sought for such systems is of the order of one milliradian.

2. Description of the Prior Art

There are various optical techniques that can be used for measuring orientation on a helmet. In general, noticeable elements are installed on the helmet and are pinpointed by a system of cameras. The position of the images of these noticeable elements makes it possible through calculation to determine the orientation of the helmet.

These elements may be passive; or active. Passive elements are illuminated by an external source. For this purpose, retroreflective corner cubes can be used as these make it possible to reduce the problems of parasitic light caused by solar illumination. All that is required is for the optical emission and reception members to be arranged on the same axis.

Active elements are generally light-emitting diodes. The cameras have a fixed focus and therefore a depth of field which is of necessity limited.

This technique has a certain number of disadvantages. The quality of the image of each point imaged on the detector is dependent on the position of the helmet and on its orientation, thus limiting the precision of the system if a significant measurement volume or a substantial range of rotation is to be covered.

SUMMARY OF THE INVENTION

The system according to the invention overcomes these two disadvantages. It essentially comprises, mounted on a fixed frame of known orientation, a single optical device of the telecentric type emitting and receiving beams of parallel light. The beams emitted come from a point source, the beams received are the result of the retroreflection of light from the source by retroreflectors mounted on the moving object the orientation of which is to be determined.

It may be demonstrated that, with this detection system, the quality of the measurement is, by construction, independent of the orientation of the helmet. Further, its other advantages are as follows:

a very simple algorithm for determining the orientation;
the possibility to adapt the direction of illumination to the position of the helmet;
great insensitivity to solar illumination;
use of entirely passive devices mounted on the helmet so that no connecting cables or electrical power supply cables are required.

More specifically, the subject of the invention is a system for detecting the posture of a moving object in space, comprising a fixed electrooptical device of known orientation comprising at least one first point emission source and a photosensitive matrix-type sensor and an assembly comprising three retroreflector devices, for example, of the "corner cube" type, arranged on the moving object, characterized in that the fixed electrooptical device comprises a telecentric lens essentially comprising a projection lens, a reception lens and a semireflective optical element which are arranged in such a way that:

the first point emission source is arranged at the focal point of the projection lens by reflection or transmission through the semireflective optical element, the image of the first point emission source is arranged at the focal point of the reception lens by transmission or reflection through the semireflective optical element.

Advantageously, the first point emission source or the image thereof is arranged on the optical axis common to the projection lens and to the reception lens.

Advantageously, the system comprises a second point emission source, the second point emission source or the image thereof being arranged off the optical axis common to the projection lens and to the reception lens.

Advantageously, in a first alternative form, with the first source emitting in a first spectral band, the second source emits in a second spectral band which is different from the first spectral band of the first source. In a second alternative form, with the first source emitting light in a first predetermined state of polarization, the second source emits light in a second predetermined state of polarization which is different from the first predetermined state of polarization. In a third alternative form, the first emission source and the second emission source emit at different moments in time.

Advantageously, the fixed device comprises a matrix of point emission sources.

Advantageously, the moving object comprises at least four retroreflector devices of the "corner cube" type. Each of the retroreflector devices of the corner cube type arranged on the moving object comprises optical or geometric discrimination means which are different from those of the other corner cubes. In a first embodiment, each corner cube comprises a mask of a shape that is different from that of the two other corner cubes. In a second embodiment, each corner cube comprises an optical filter the transmission spectral band of which is different from that of the two other filters of the two other corner cubes.

For preference, the moving object is a pilot helmet.

BRIEF DESCRIPTION OF THE DRAWINGS

The invention will be better understood and other advantages will become apparent from reading the following description given by way of nonlimiting example and by studying the attached figures among which.

DETAILED DESCRIPTION

Figure 1:
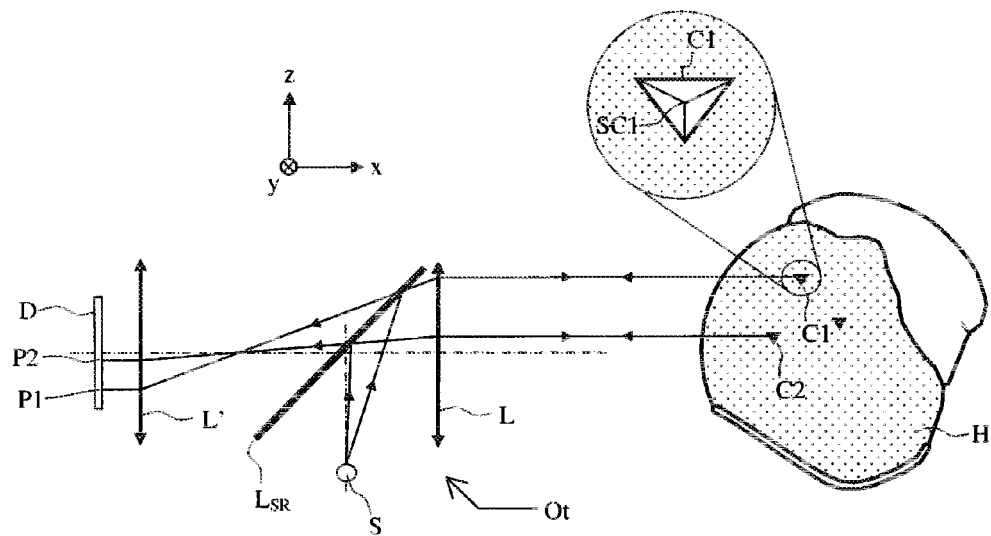
FIG. 1 depicts a first embodiment of the detection system according to the invention, comprising a single point source.

By way of a first example of how the invention is embodied, FIG. 1 depicts a first embodiment of the detection system according to the invention in the simplest case, which means to say in the case comprising a single point source and in the context of the detection of the orientation of a pilot helmet. This first configuration can very easily be adapted to suit other applications.

The system essentially comprises two subassemblies, a fixed electrooptical device and a helmet the orientation of which is to be determined. It is referenced in a frame of reference (O, x, y, z).

The fixed electrooptical device is situated in an aircraft cockpit and occupies a known orientation with respect to the frame of reference of the aircraft.

The electrooptical device comprises an almost point source S of light. This source may be a light-emitting diode or a laser diode.

It also comprises a telecentric optical system Ot comprising a projection lens L, a reception lens L' and a semireflective optical element $L_{SR}$. The projection lens L, like the reception lens L', may be made up either of single lenses or of groups of individual lenses. The semireflective optical element may be either a treated simple flat sheet as depicted in the various figures, or a cube splitter. The assembly comprised of the projection and reception lenses constitutes an afocal system, which means that their focal point is common.

The image of the source S is arranged at the focal point of the projection lens L by reflection off the semireflective optical element $L_{SR}$. As a result, the image of S is collimated at infinity by the lens L which thus emits a beam of parallel light in a direction x as indicated in FIG. 1. it makes no difference whether the semireflective optical element $L_{SR}$ is used in reflection on the emission path and in transmission on the reception path, or vice versa.

The helmet H of FIG. 1 is equipped with at least three retro-reflectors C of the corner cube type. it is known that these optical elements have the property of reflecting light in its direction of incidence. As a result, each of the corner cubes C will return a pencil beam of light towards the lens L.

These beams are all mutually parallel. Each of these beams passes through the optical assembly consisting of the projection and reception lenses L and L' and the semireflective sheet $L_{SR}$. The beams, on exiting the lens L', are once again mutually parallel and fall onto a matrix-type detector D which therefore picks up the image of each reflector C. The detector D is, for example, a matrix of the CCD (Charge Coupled Device) type. Only two of the three beams have been depicted in FIG. 1 for the sake of keeping the figure clear. These come from the corner cubes C1 and C2. It may be demonstrated that the direction of the central ray of each reflected beam always passes through the vertex SC of a reflector C whatever the orientation of the reflector with respect to the illuminating beam. The centre P of the spot of light projected onto the detector D therefore always indicates the direction of the vertex SC of the corner cube with respect to the detector.

The respective images of the vertices SC1 and SC2 of the corner cubes C1 and C2 are therefore situated at P1 and P2 on the detector.

The positions of the points P1 and P2 on the detector D are not dependent on the abscissa values x of C1 and C2.

The major benefit of this optical setup is that the deviation between the positions of P1 and P2 is not dependent on translational movements of the helmet H but dependent only on the orientation of said helmet. Knowing the length d12, which is the distance separating the vertices SC1 and SC2 of the corner cubes C1 and C2, the unknown orientation of the axis C1C2 is thus completely determined, give or take the sign, by the relative position of P2 with respect to P1 on the detector D.

More specifically, the helmet H is equipped with three corner cubes C1, C2 and C3 with vertices SC1, SC2 and SC3.

The distances d12 separating the vertices SC1 and SC2 and d13 separating the vertices SC1 and SC3 are known. It is possible, for example and for the sake of simplification, to choose for the axis C1C2 to be perpendicular to C1C3. The orientation can still be determined if the axes C1C2 and C1C3 make a different angle between them, but the calculation is just a little more complicated.

The front face of each reflector is equipped with an optical or geometric discrimination device which is different from that of the two others.

By way of a first example, the reflectors can be discriminated in terms of their shape. The outline of the cross section of each reflector is then customized using a mask of a particular shape, a circle or a diamond for example, that partially blocks off the incident and reflected beams.

By way of a second example, the reflectors can be discriminated in terms of their colour. A red, green, blue or yellow coloured filter is placed in front of each of the reflectors. In such a case it is, of course, necessary to use a broad-spectrum source and a polychromatic detector or several detectors separated by dichroic filters, each detector being dedicated to a particular spectral band. It should be noted that the word "colour" is not necessarily limited to the visible spectrum. It is also possible to use two different spectral bands situated in the near infrared or in the near ultraviolet.

It is of course possible to combine the two methods of discrimination: shape and colour. Thus, a first reflector would comprise a red circular mask, a second reflector would comprise a green circular mask and a third reflector would comprise a red mask or green mask in the shape of a diamond.

Through this means the points P1, P2 and P3 on the detector D can be assigned to the corresponding vertices without the risk of error.

On the detector D, the coordinates measured in the fixed frame of reference (O, x, y, z) of the points P1, P2 and P3, which are the images of the vertices SC1, SC2 and SC3, are as follows:

$$P1(y1, z1), P2(y2, z2) \text{ and } P3(y3, z3)$$

For an afocal system, for example of unit magnification, the projection parallel to the axis x onto the vertical plane D connects the unknown components (x12, y12, z12) of the vector C1C2 of known length d12 to the coordinates of P1 and P2 by the relationships:

$$y12=(y1-y2)$$

$$z12=(z1-z2)$$

$$x12=\epsilon[d12^2-(y1-y2)^2-(z1-z2)^2]^{0.5} \text{ with } \epsilon=+/-1$$

Likewise, the components (x31, y31, z31) of the vector C1C3 are:

$$y13=(y1-y3)$$

$$z13=(z1-z3)$$

$$x13=\epsilon'[d13^2-(y1-y3)^2-(z1-z3)^2]^{0.5} \text{ with } \epsilon'=+/-1$$

The indeterminacy of the values of $\epsilon$ and of $\epsilon'$ is partially resolved by the following relationship:

C1C2 is perpendicular to C1C3, so:

$$x12.x13+y12.y13+z12.z13=0, \text{ which also means that:}$$

$$\text{sign of } (x12.x13)=\epsilon.\epsilon'=-\text{sign of } (y12.y13+z12.z13);$$

So there are now only two solutions which are symmetric about the vertical plane (y, z).

There are various techniques that can be used to resolve this last indeterminacy. By way of first example, it is possible to add a fourth corner cube C4 the vertex of which is not coplanar with that of the three others. The four corner cubes therefore form a tetrahedron.

Figure 2:
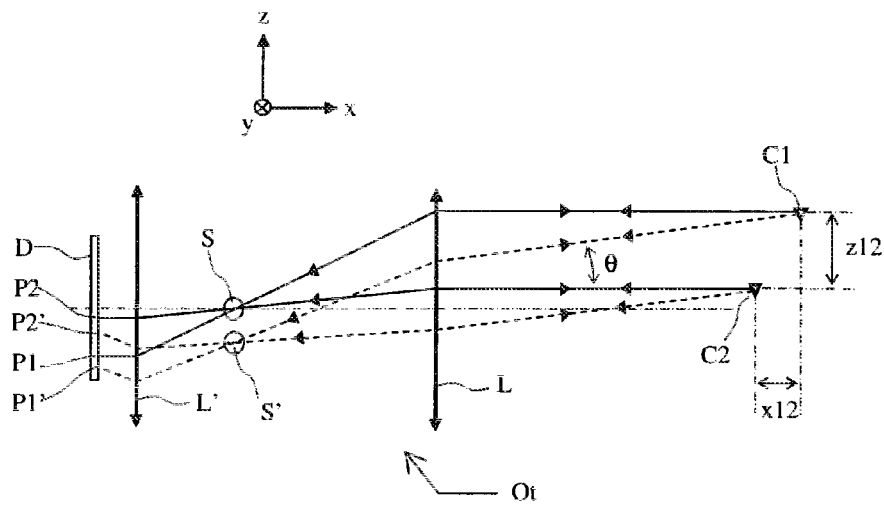
FIG. 2 depicts a second embodiment of the detection system according to the invention comprising two distinct point sources.

By way of a second example illustrated in FIG. 2, the remaining indeterminacy can also be resolved by adding a second source S' in the focal plane of the lens which, by defining a second direction of projection, generates three other images P'1, P'2 and P'3 on the detector D or on a second detector D'. In FIG. 2, for the sake of clarity, the semireflective sheet $L_{SR}$ has not been depicted. The rays of light from this source S' are depicted in dotted line.

The source S' is, for example, on the same vertical as the source S, the corresponding oblique axis of projection is parallel to the vertical plane (x, z), its orientation θ is given as a function of the focal distance f of L and L' by the conventional relationship tanθ=S'S/f For P'1 and P'2, we have the relationship: $z12'=(z'1-z'2)+x12.\tan\theta$ For P1 and P2, we have the relationship: $z12=(z1-z2)$ Hence, x12 is given by the unambiguous equality:

$x12=[(z1-z2)-(z'1-z'2)]/\tan\theta$

In order to isolate the images of the source S' from those of the source S, the source S' may, for example, be centred on another wavelength, another polarization, or be activated in alternation with S.

In the first instance, each source S and S' radiates in a determined colour. A coloured filter is therefore positioned in front of each pixel of the detector D or use is made of two detectors combined using dichroic mirrors. In such an instance, it is preferable for the reflectors to be discriminated in terms of shape.

In the second instance, the sources are discriminated by polarization. The two sources of the same colour therefore radiate either in two crossed directions of linear polarization or in two opposed directions of circular polarization. Use is then made of two detectors which are combined by a polarization splitter. The corner cubes are metallized in order to conserve the incident polarization.

In the last instance, the two sources are activated alternately and images are analysed on the detector separately for two successive images.

Once this indeterminacy of sign has been resolved using one of the two methods described hereinabove, the device makes it possible, unambiguously, to determine the components of the vectors C1C2 and C1C3, which are fixed on the helmet, and therefore the orientation of the helmet in space.

By comparison, a system employing central projection comprising a fixed focus camera forms the image P1 of the front face of C1 or of an equivalent diode on the plane of the detector D for just one single helmet position. Further, for this helmet position, the image of the front face of C2 is on the detector only for a particular orientation of C1C2 and therefore only for particular helmet orientations.

Figure 3:
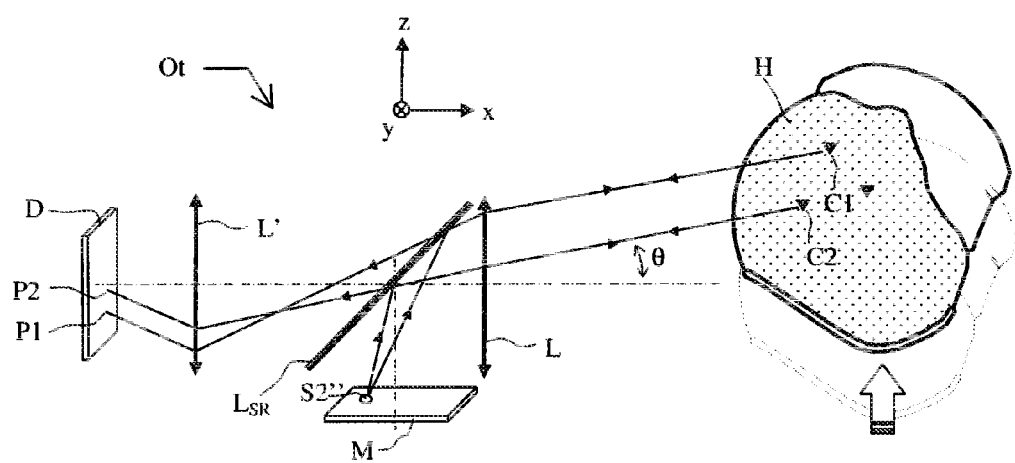
FIG. 3 depicts a third embodiment of the detection system according to the invention comprising a matrix of point sources.

The projection lens L needs to have a sufficient aperture diameter that it can cover the entire field of movement of the helmet. In order to avoid the use of excessive diameters, it is possible to use the arrangement depicted in FIG. 3.

The source S is replaced by a matrix M of light sources S''. The matrix M is positioned on the focal plane L by reflection off the semireflective sheet $L_{SR}$.

In standard operating mode, a single source S1'' is illuminated on the matrix M. When the helmet changes position as depicted in dotted line in FIG. 3, the images P1 and P2 reach the edge of the detector. This configuration can be recognized by simple image processing. When it happens, the source S1'' that was initially active is switched off and another source S2'' is illuminated in order by construction to bring the images P1 and P2 back towards the centre of the detector D.

The axis of projection is oblique, and its orientation θ is known. For example, in the vertical plane (x, z), the orientation θ is given by:

tanθ=$S''S''_0/f$ where $S''_0$ is that point of the matrix, generally its centre, that is situated on the optical axis of the afocal system. The previous three relationships for C1C2 then become:

$y12=(y1-y2)$ $z12=(z1-z2)+x12.\tan\theta$ $d12^2=x12^2+(y1-y2)^2+[(z1-z2)+x12.\tan\theta]^2$ The latter equality as before gives two values for x12, and therefore two solutions for the vector C1C2. These are no longer symmetric about the vertical plane (y, z).

One simple way of resolving the ambiguity is to use two sources in the matrix which are illuminated in succession in order to determine an orientation of the helmet.

The device according to the invention makes it possible to achieve great precision. For example, for an angular field of 45 degrees and a detector measuring 1000 points by 1000 points, a precision of 0.045 of a degree, namely 0.7 mrad, is obtained, and this is precise enough for the vast majority of applications.

The helmet can therefore replace the head-up display function which has high precision in the centre of the angular range and in a wide range of head positions.

The optical posture-detection device can also be hybridized, in the centre of the angular range, with electromagnetic posture detection which is not as precise but which does have a very wide measurement range.

What is claimed is:

1. A system for detecting a posture of a moving object in space, comprising a fixed electrooptical device of known orientation comprising at least one of a first point emission source and a photosensitive matrix-type sensor and, arranged on the moving object, an assembly comprising at least three corner cube retroreflectors,
   wherein the fixed electrooptical device comprises a telecentric lens comprising a projection lens, a reception lens, and a semireflective optical element that are arranged in such a way that:
   the first point emission source is arranged at the focal point of the projection lens by reflection or transmission through the semireflective optical element, and
   the image of the first point emission source is arranged at the focal point of the reception lens by transmission or reflection through the semireflective optical element.

2. The system according to claim 1, wherein the first point emission source or the image thereof is arranged on an optical axis common to the projection lens and to the reception lens.

3. The system according to claim 2, wherein the system comprises a second point emission source, the second point emission source or the image thereof being arranged off the optical axis common to the projection lens and to the reception lens.

4. The system according to claim 3, wherein, with the first source emitting in a first spectral band, the second source emits in a second spectral band which is different from the first spectral band of the first source.

5. The system according to claim 3, wherein, with the first source emitting light in a first predetermined state of polarization, the second source emits light in a second predetermined state of polarization which is different from the first predetermined state of polarization.

6. The system according to claim 3, wherein the first emission source and the second emission source emit at different moments in time.

7. The system according to claim 1, wherein the fixed device comprises a matrix of point emission sources.

8. The system according to claim 1, wherein the moving object comprises at least four corner cube retroreflectors.

9. The system according to claim 1, wherein each of the corner cube retroreflectors arranged on the moving object comprises an optical or geometric discrimination device, and wherein the optical or geometric discrimination devices are different from each other.

10. The system according to claim 9, wherein each of the corner cube retroreflectors comprises a mask of a shape and wherein the masks of the shapes are different from each other.

11. The system according to claim 9, wherein each of the corner cube retroreflectors comprises an optical filter, wherein each of the optical filters transmits a spectral band, and wherein the spectral bands are different from each other.

12. The system according to claim 1, wherein the moving object is a pilot helmet.

\* \* \* \* \*